US010079126B2

(12) United States Patent
Merrell

(10) Patent No.: US 10,079,126 B2
(45) Date of Patent: Sep. 18, 2018

(54) CARD OPERATED POWER PLUG INTERRUPTER/MONITOR AND METHOD OF USE

(71) Applicant: Justin D. Merrell, Gaithersburg, MD (US)

(72) Inventor: Justin D. Merrell, Gaithersburg, MD (US)

(*) Notice: Subject to any disclaimer, the term of this patent is extended or adjusted under 35 U.S.C. 154(b) by 52 days.

(21) Appl. No.: 15/207,067

(22) Filed: Jul. 11, 2016

(65) Prior Publication Data

US 2017/0032911 A1 Feb. 2, 2017

Related U.S. Application Data

(60) Provisional application No. 62/191,364, filed on Jul. 11, 2015.

(51) Int. Cl.
*H01H 27/06* (2006.01)
*G05B 15/02* (2006.01)
*H01R 13/639* (2006.01)
*H01R 13/70* (2006.01)

(52) U.S. Cl.
CPC ......... *H01H 27/06* (2013.01); *G05B 15/02* (2013.01); *H01R 13/6392* (2013.01); *H01R 13/70* (2013.01); *H01R 13/6397* (2013.01)

(58) Field of Classification Search
CPC .... H01H 27/06; H01R 13/70; H01R 13/6392; H01R 13/6397; G05B 15/02
See application file for complete search history.

(56) References Cited

U.S. PATENT DOCUMENTS

| 4,482,789 A | 11/1984 | McKey |
| 4,870,531 A | 9/1989 | Danek |
| 5,169,326 A | 12/1992 | Werner |
| 5,338,218 A | 8/1994 | Haas |
| 5,432,387 A | 7/1995 | Kogure |
| 5,434,368 A | 7/1995 | Hoffman |
| 5,486,824 A | 1/1996 | Kinerk |
| 5,592,032 A | 1/1997 | Keizer |
| 6,011,328 A | 1/2000 | Smith |
| 6,461,176 B1 | 10/2002 | Haas |
| 6,519,208 B2* | 2/2003 | DeVries ............... G04G 15/00 174/50 |
| 6,618,232 B2 | 9/2003 | Huang |
| 7,582,990 B2 | 9/2009 | Haas |
| 7,786,624 B2 | 8/2010 | Haas |
| 2006/0238028 A1* | 10/2006 | Gotou ................. H01H 27/06 307/10.1 |

(Continued)

*Primary Examiner* — Michael C Zarroli
(74) *Attorney, Agent, or Firm* — Gary P Topolosky

(57) ABSTRACT

A device that is placed between the electrical power source and electrical equipment such that power going to the equipment can be controlled, regulated, and monitored. An individual may request access to use the electrical equipment by means of unique identification. The device is able to compare the user's request for authentication via a locally stored list (database) or remotely situated list. The device contains audio and visual indications of the current status of power going to the electrical device. An apparatus is used to prevent a user from disconnecting electrical equipment from the device and reconnecting it directly to the power source. A related method of use is also claimed.

10 Claims, 5 Drawing Sheets

(56) References Cited

U.S. PATENT DOCUMENTS

| | | | |
|---|---|---|---|
| 2009/0192927 A1* | 7/2009 | Berg | G06Q 30/04 705/34 |
| 2010/0228405 A1* | 9/2010 | Morgal | B62H 3/02 701/2 |
| 2010/0264752 A1 | 10/2010 | Wong | |
| 2011/0029146 A1* | 2/2011 | Muller | B60L 11/1816 700/293 |
| 2012/0100492 A1 | 4/2012 | Hodapp | |
| 2014/0002018 A1* | 1/2014 | Montemayor Cavazos | B60L 11/1818 320/109 |
| 2015/0362985 A1* | 12/2015 | Thompson | G06F 1/3215 713/323 |
| 2016/0221816 A1* | 8/2016 | Pollock | B67D 7/348 |

* cited by examiner

CARD OPERATED POWER PLUG INTERRUPTER/MONITOR AND METHOD OF USE

CROSS-REFERENCE TO RELATED APPLICATION

This is a perfection of Provisional Application Ser. No. 62/191,364, filed on Jul. 11, 2015, the disclosure of which is fully incorporated by reference herein.

BACKGROUND OF THE INVENTION

The present invention relates to power control devices for selectively disabling current flow to a device, external to and separate from the device. It entails locking a power plug for the device with an external card (a/k/a smart card) reader system that can also keep record of who uses the device and for what length of time. It also enables card-holding subscription use of any given device to which it is externally connected . . . such use being controlled through multiple card dispensing (rather than through the single locking key system of known prior art systems).

The present invention, for possible marketing under the name Recursion Access System™, further relates to a system of controlling the access to electrical equipment. In an environment where individuals use powered tools and equipment (e.g., machine shops and makerspaces), there may be a desire to control and/or monitor the accessibility and usage of the equipment. In a workshop environment there are number of reasons why it would be desirable to have a method of control on powered equipment. The first convincing reason to have a method of control would be to maintain a safe environment and attempt to reduce the chance of risk associated with individuals accessing equipment that they have not been properly trained on. Another reason would be to maintain a record of equipment usage, weather this be power consumption relating to usage by an individual or production.

The current methods of addressing the need for accessibility control are limited to solutions occasionally referred to as "Lock Out Tag Out" where the physical power connector or switch to a piece of equipment is locked and unable to be enabled until the lock has been removed by the individual who initially put on the lock. Any electronic or computer controlled solutions to limiting the flow of current do not have the added feature of uniquely identifying the individual that is attempting to access the powered equipment.

Accordingly, there is a need for a solution that adequately controls the access to equipment based on a set of permissions based on individual allowances.

Relevant Art

The following references, arranged chronologically, may be relevant to this disclosure: McVey U.S. Pat. No. 4,482,789, Danek U.S. Pat. No. 4,870,531, Werner U.S. Pat. No. 5,169,326, Haas U.S. Pat. No. 5,338,218, Kogure U.S. Pat. No. 5,432,387, Hoffman U.S. Pat. No. 5,434,368, Kinerk U.S. Pat. No. 5,486,824, Keizer U.S. Pat. No. 5,592,032, Smith U.S. Pat. No. 6,011,328, Haas U.S. Pat. No. 6,461,176, Huang U.S. Pat. No. 6,618,232, Haas U.S. Pat. No. 7,582,990, Haas U.S. Pat. No. 7,786,624, Wong U.S. Published Application No. 20100264752 and Hodapp U.S. Published Application No. 20120100492.

It may be critical from both a safety AND security perspective to limit who may be permitted to operate certain electrical devices. It is well known to build into some devices an electronic monitoring system/lockout that allows only authorized operation of said device. That may entail a keyed lockout, insertable card such as the type used to operate most hotel door locks today, and/or still other electronic prohibitions that use fingerprints, eye readers and the like. The primary focus of this invention is to make such security measures more universally available . . . without having to require highly sophisticated equipment add-on's to the control/operating devices of each and every machine/device. This invention enables greater control over who may legitimately run any given electronic device by being able to easily and effectively interrupt the flow of power to run that given device. It is simple to install, run and monitor outputs from. In this manner, it provides far greater protection AND UTILITY that a mere key lockout from the past (see, "Voltbolt.com") while providing greater flexibility of use (and control over lists of authorized personnel) than might otherwise be associated with overly sophisticated electronic readers of fingerprints, retina, etc.

SUMMARY OF THE INVENTION

The present invention addresses the above-described deficiencies as well as other deficiencies associated with the prior art. The invention relates to power control devices for selectively disabling current flow to a device, external to and separate from the device. It entails a power plug for the device with an external card (a/k/a "smart card") reader system that can also keep record of who uses the device, for what length of time, and amount of power consumed.

The present invention is directed to a power control device that prevents unauthorized and unwanted use of any electrical device that might otherwise prove difficult to remove from its present location, due to size, weight and/or relative positioning (e.g., on shelves, behind desks, in overhead mounts, etc.). The power control device is such that it receives a plug of the electrical device, and allows for the passage of electric current through the power control device, from the current source to the electrical device when the power control device is unlocked. When the same power control device is locked, electric current flow through the power control device is stopped. This is accomplished by requiring one of several AUTHORIZED electronic cards to an external card reader which can just as easily be disconnected from a piece of operating equipment and quickly moved to another for its monitoring and control.

The present invention provides an inexpensive, portable, and convenient device that is operable to prevent unauthorized use of electrical appliances and other electrical devices. Such a power control device is useful, for example, with computers, television sets, radios, power tools, and other electrical devices, to interrupt the power to the electrical device and prevent an unauthorized user from plugging the electrical device into an electrical receptacle other than the power control device, thereby circumventing the effectiveness of that device.

The power control device of the invention is simple, convenient, inexpensive to manufacture, easy to use, and effective at preventing unauthorized use of an electrical device, to which it attaches, through the separate (or, alternatively, integrally connected) plug cover for the main body/box of this invention.

One embodiment of the invention is directed to a power control device that prevents unauthorized and unwanted use of electrical devices by locking the plug of the electrical device in the power control device, when the current flowing through the power control device is stopped. The device may further include a manual knob or switch, movable between ON and OFF conditions. Alternately, the switch is electronic as in an on-off relay. In any case, the device moves the power cord to an external apparatus into a power flowing position when an authorized e-card is situated into its assigned card reader slot. When the card is not in the proper place, this invention will keep the equipment in an inoperable, locked or powered off condition with no current being permitted to flow therethrough and power up the equipment proper. The equipment itself becomes "temporarily" inoperable and cannot resume normal operation until a duly authorized card has been inserted into the reader slot assigned thereto for essentially, electrically "unlocking" the equipment for use once more.

Another embodiment of the invention is directed to a method for using the aforementioned device as a means for controlling the delivery of external power to any given piece of equipment to which it is manually connected. This method controls the flow of power to an electrical device by adding an interrupter switch between.

BRIEF DESCRIPTION OF THE DRAWINGS

Attention is now directed to the accompanying drawings and diagrams in which.

DETAILED DESCRIPTION OF PREFERRED EMBODIMENTS

Figure 1:
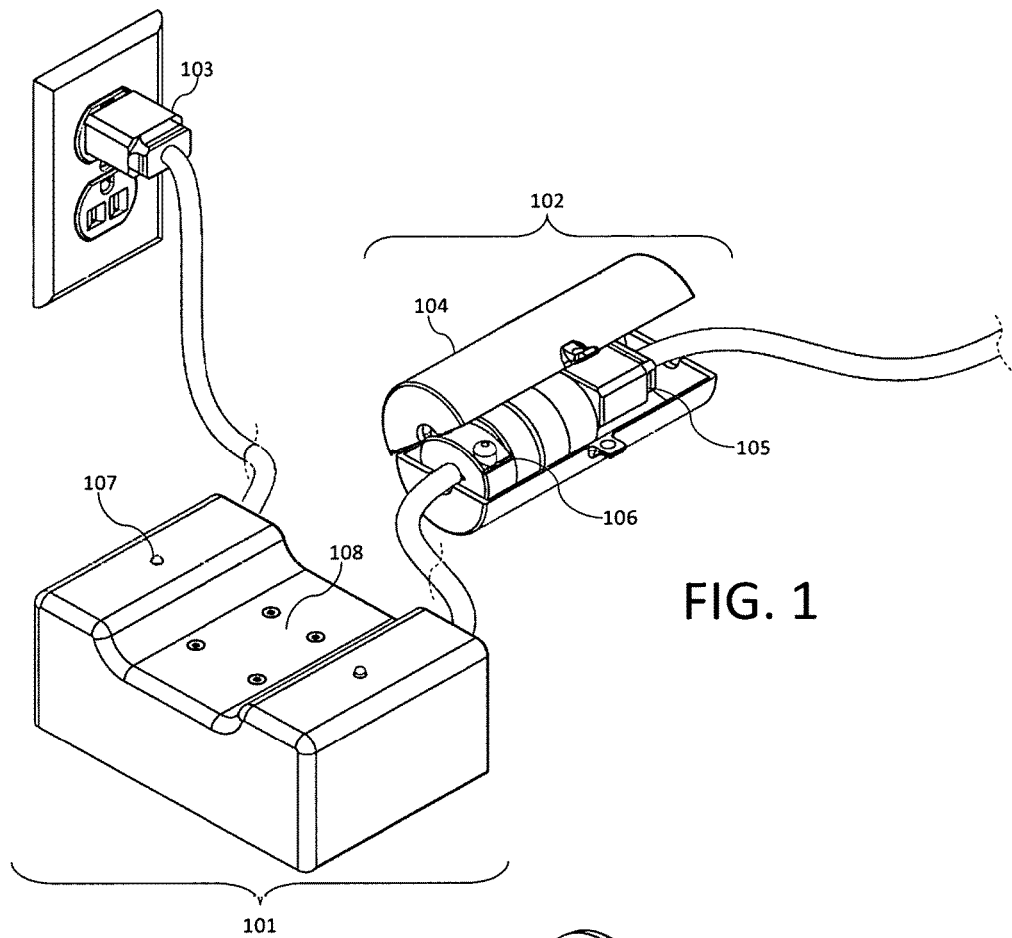
FIG. 1 is a depiction of all aspects comprised within the invention.

As used herein, the following terms are meant to expressly include: "Requester" is also a user, member, individual and/or cardholder. "Device" further includes tools, equipment and/or resources.

This invention uniquely identifies an individual (authorized operator) through one or more of the following methods:

RFID (Radio Frequency Identification)
NFC (Near Field Communication)
Biometrics:
  Fingerprint
  Ear
  Heart Rate
  Naturally Eliminated Electromagnetic Field
  Sitting Position
  The eye
  Veins in hand
  Facial Imaging
Pin Number
Magnetic Strip
Barcode Internal to each interrupter, this invention can quickly check a database for a list of authorized access users with equipment access being dynamically adjusted for an interface with full/limited access for a limited preset time or for as long as the user's reader card remains lawfully connected thereto. Alternately, the database can be searched (and maintained) external to the system of this invention.

The system (and related method) of this invention can also be used as a lockout that will PRECLUDE any unsanctioned use of a given piece of equipment to which it is connected. Access cards for this system/method will be able to more fully track when a system was accessed, by whom, and for how long.

Furthermore, the overall system construct will enable management to accurately track the amount of power consumed by a given piece of equipment. Data can be stored locally, or remotely through a wireless or wired connection.

The system is placed in line with the power cord for any such device and, as such, should be able to serve as a power interrupter for most plug or voltage level. When used with a locking plug wrap/box (external or integral to the unit itself), this plug will remain "secured" so as to preclude any one individual from manually overriding it.

One particular model, developed for a medical device operator, led to the inclusion of certain optional features including a calendar style user control that accommodates settings for varying medical patients. Another component/ advantage of this system is its use of fairly inexpensive RFID cards that allow a given doctor's office the option of providing limited distribution of personalized reader cards to its patients.

Yet another anticipated end user of this device would be the shop teachers at a given trade, elementary or high school that routinely employs dangerous wood and/or machine shop equipment. This invention would more severely restrict who MAY run a particular saw and for how long, for instance.

This invention offers a low cost, easy to use, powerful access control and equipment management system. The system (and its related method of use) seamlessly combines the following three essential components to a space management system:

Payment acceptance for membership and users
Space access and control with RFID; and
Equipment management with RFID.

This system provides the equivalent features of existing space access systems at a fraction of the cost; then offers a range of powerful benefits that current systems do not provide:

Value proposition and easy use.

Yet another component of this system/method is providing LIVE, real time equipment access/use to those who are fully paid up members to a makerspace and/or shared equipment and resource center. Conversely, those not having up-to-date, fully paid memberships can be near instantaneously denied access integration or have the power to their apparatus rapidly shut off.

Locations that currently employ a membership-based model (e.g. makerspaces) have two separate systems for accepting payment before providing access to the space. Their method requires an individual to update the list of individuals to be given access based on their ability to pay. The system of this invention, by contrast, is completely integrated. Hence, it reduces employee time and the possibility of unauthorized access through human error.

Business can be proactive in their security and safety by utilizing the preferred system of this invention. It will restrict unauthorized access while further logging all transactions for later review. This is ideal for a business that uses high-risk equipment and would like to do everything it can to reduce the likelihood of an insurance claim.

While the system is built on a foundation of open source components, the main controller board that it employs combines a number of different components in a customer configuration for manufacturing and installation benefits. This invention should be the first to market offering a system designed especially for co-working and makerspace environments.

The use of RFID's for resource management is a unique concept. With the "Plug and Play" modular components of this invention, operators will be able to grow their systems with less concern about lost space for safety/security control concerns. The system/method herein can be added to, or integrated with, existing devices/equipment. This will allow customers to begin using THE system without changing their infrastructure.

The accompanying drawings are for purposes of illustrating various aspects of the present invention and are not meant to limit the scope of the present invention. Referring now to FIG. 1, the power controller or node 101 is shown along with the power connector enclosure 102. Node 101 is connected to the main power source 103 that will provide current for both the electronics within the node 101 and the equipment being controlled (not shown). Node 101 has a method of input for identification, in this case, a flat surface 108 used as a resting place for an individual's Radio Frequency Identification (RFID) card. There is an indicator 107 to at least visually (if not also audibly) convey the node's status. This indicator 107 is shown in the drawing as an LED.

Attached to node 101 with a cable is a female electrical connector 106 that connects with the equipment's male connector 105. From the power junction 102 between node 101 and the equipment, there is a connector enclosure cover or apparatus 104 that holds both connectors for ensuring that the power controller cannot be circumvented without physically damaging either the system or equipment.

Figure 2:
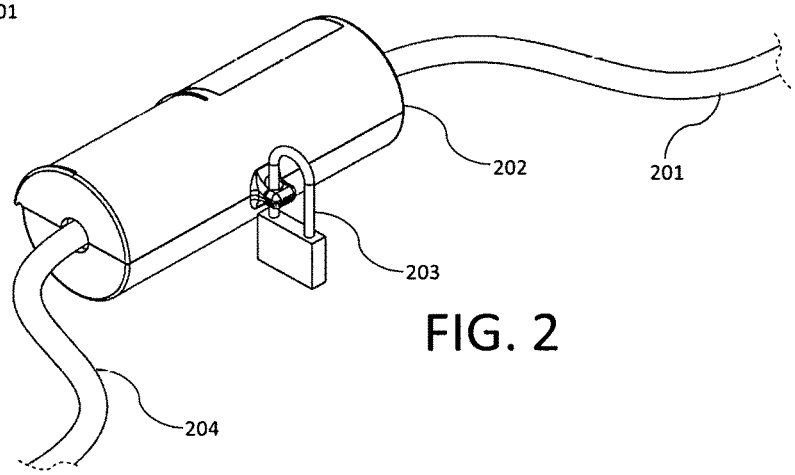
FIG. 2 is an additional close up view of the plug connection apparatus while closed showing the locking.

In FIG. 2, the connector enclosure is shown in a fully closed position as element 202. Once closed, the system administrator can secure such an apparatus by keeping both halves closed as demonstrated with a padlock 203 in the drawing. On the left side of the enclosure is a cable 204 that connects current supplied from the node to power equipment connected to the cable 201 on the enclosure's right side. The enclosure 202 is a critical component of the system as it ensures the equipment cannot be supplied current by any other means aside from the node without physical damage.

Figure 4:
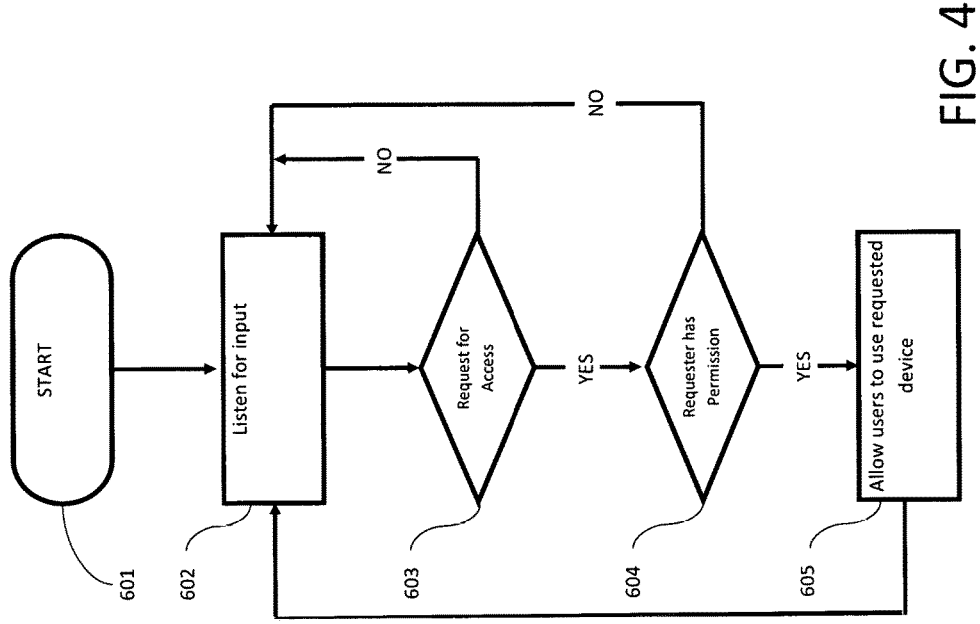
FIG. 4 is an operational flowchart of the system at is basic core components.
Figure 3:
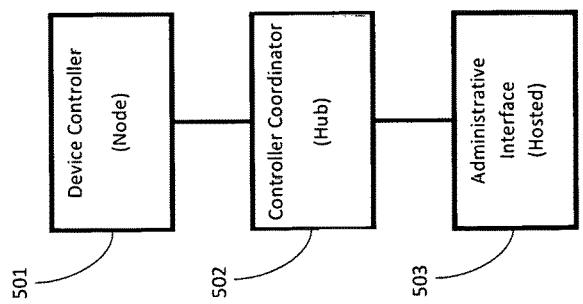
FIG. 3 is a block schematic of the individual system components.

An overview of the entire system can be seen in FIG. 3, showing the device controller 501, controller coordinator 502, and the administrative interface 503. The three aspects of the system can be integrated into a single node 101 or separated. The key operations performed by the current interrupter can be seen in FIG. 4, the system is active and starts 601 as soon as the node is plugged into the main power source 103 and the equipment's power connector 105 has been secured within enclosure 104. After starting 601, the controller will await input 602 such as an individual requesting to access equipment 603. If a request for access has been received, the system will ensure that the individual has permission 604 to use the equipment before current is allowed to flow 605.

Figure 5:
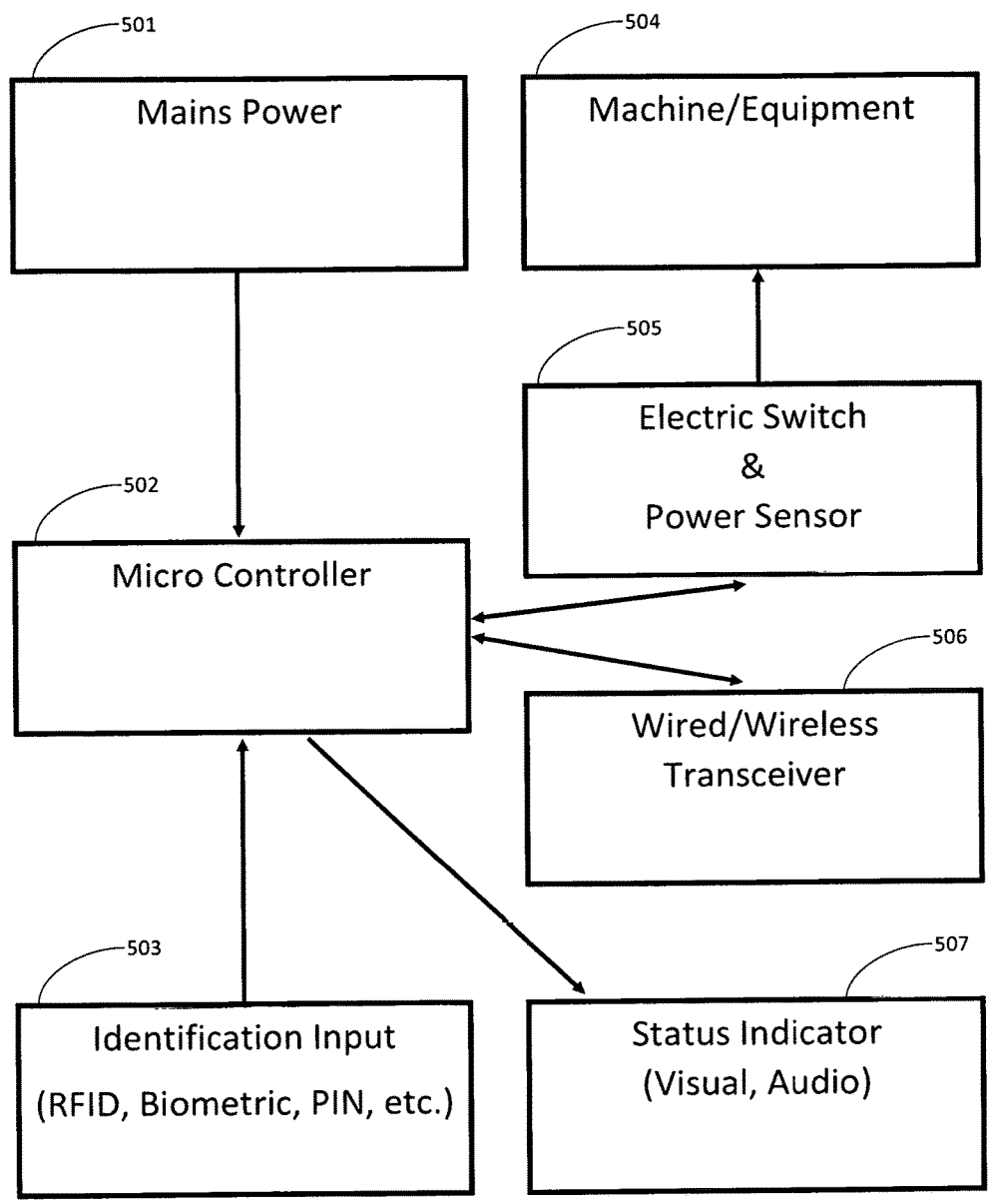
FIG. 5 is a block diagram of the node operation.

To achieve the operation described above the node must contain at least all elements shown within FIG. 5. The node will receive current from the main power 501 that will supply the necessary power to both the microcontroller 502 as well as the equipment 504. The microcontroller 502 processes the identification input 503 provided by a user and confirms (through either localized or remote database) that is accessed through a transceiving unit 506. After a user's accessibility has been determined, the user is made aware through an indicator 507 that may be visual and/or audio. Having determined that a user is permitted access, the micro controller 502 will allow the flow of current with the use of an electronic switch 505. As the equipment 504 is being operated, the power usage data is relayed back to the micro controller by means of a current sensor 505.

Figure 6:
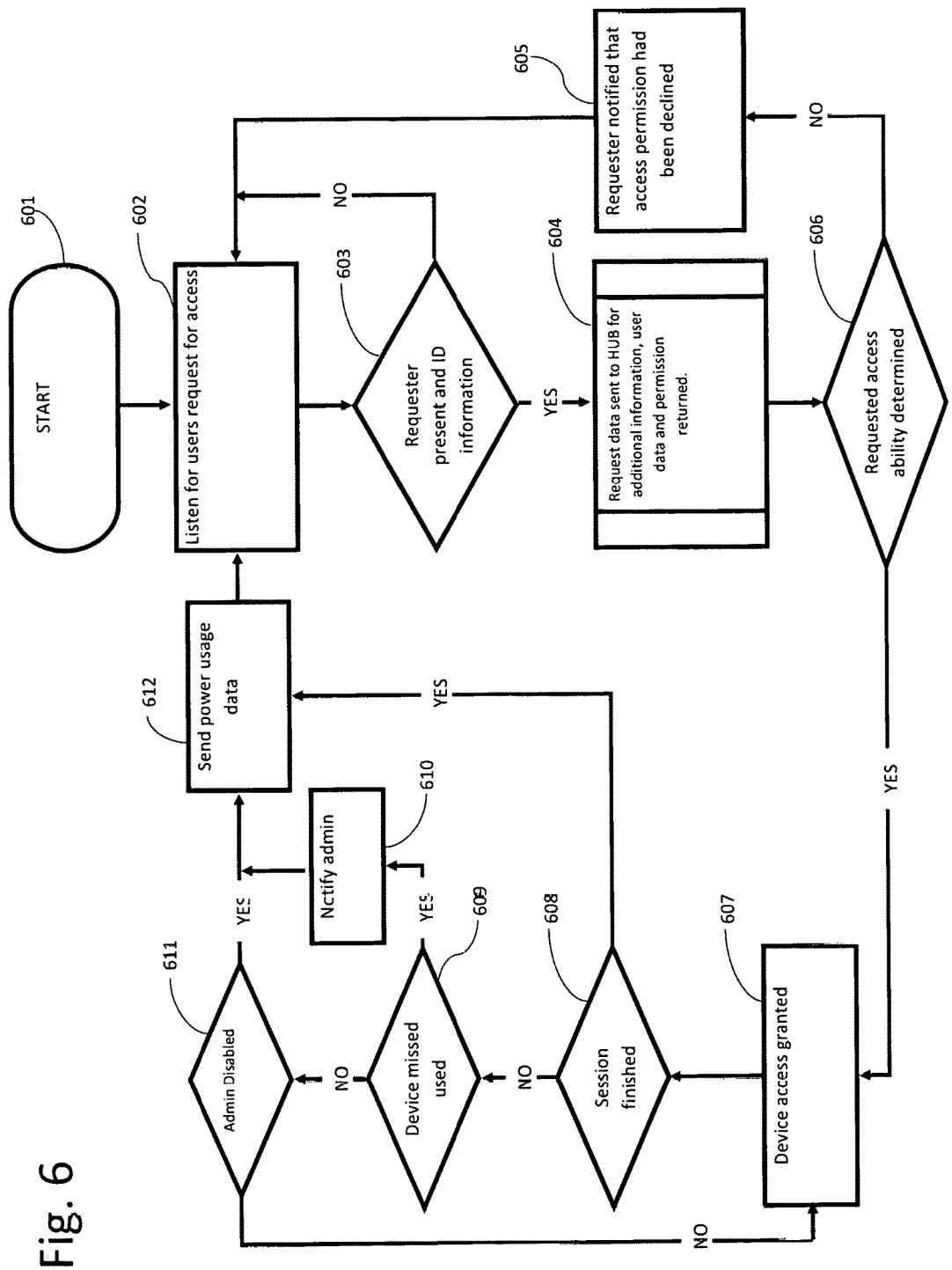
FIG. 6 is an operational flowchart of the device and the decisions necessary to control the access to equipment.

FIG. 6 provides a detailed breakdown of the necessary decisions that occur within the current controller. Upon initiating 601, the system awaits external input 602 from a user with an identification method 603. Note, there are a variety of identification methods with each one uniquely identifying the user. The request for access is then compared 604 with either a local or remote database to determine if a user is able to access the particular piece of equipment attached to the node. After that comparison is made with a database, the user is notified of the results 605 and either allowed access 607 or declined access.

While current is allowed to flow to the equipment, the node continuously monitors current flow until the operation session 608 has concluded. While the equipment is being operated, current draw data is being collected to either report 612 at the conclusion of a session or determine if equipment misuse 609 is occurring by means of excessive current draw resulting in a notification 610 sent to an administrator. The current will continue to flow as long as both those conditions remain false, unless the device is remotely disabled 611 by a system administrator.

Figure 7:
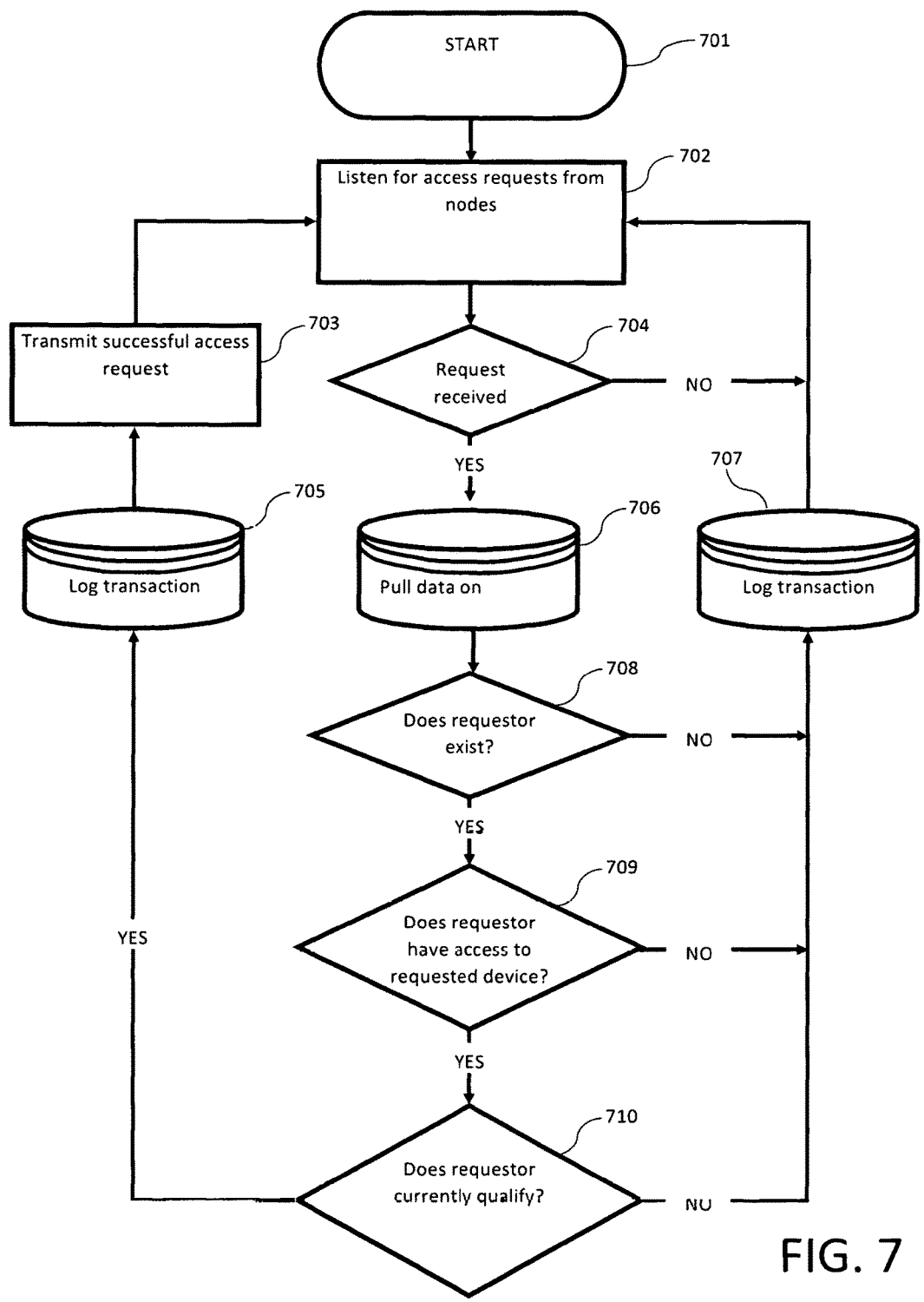
FIG. 7 is a flowchart of a hub.

The final drawing, FIG. 7, provides a flow chart of how information is processed on the hub side that may be incorporated into the node or kept external thereto. Once the system has started 701, the hub awaits for data 702 to be sent by the node. Upon receiving data 704 from the node, that data, comprised of a user's ID and machine request source, is used to compile all permissions 706 available to the user. If the user per se exists 708, the next comparison is made to determine if that user has access to the particular piece of equipment 709 they are attempting to access. The final criterion is to determine if the requestor has access at the current time 710 in which they are requesting. During any point of the process, if a user has been declined a record is logged as unsuccessful 707. If a user has passed all criteria successfully, an access record is recorded 705 and the node updated 703 so that the user may now fully access the powered up equipment.

The apparatus, from here on referred to as the node, being protected is a device that contains a method of limiting the access of powered equipment only to authorized individuals. The node is able to be placed inline with any device that has a power cord and does not require the device of which it is connected to, to be modified. The node contains: (i) an input whereby a user can identify him or herself using a variety of methods, (ii) a way to notify the requester of the nodes status, and (iii) a computer that can relay the requestor's identification to a central database for determining whether the requestor has permission to be using the device.

The node uses a method of power interruption to best restrict a user's utilization of a particular piece of equipment. As an additional benefit of using the node, there is an ability to monitor the power consumption of the device it is connected to. That collected information can then be used for both tracking how much power is being used by an individual or device, as well as an alert to an administrator that the device may be being misused.

As part of the node, it is critical to have a method of control that prevents a requestor from overriding the node by simply unplugging the device from the node and into an outlet. This level of control is obtained by having an apparatus that securely locks together the device's male power plug to the nods female power connector. The apparatus that maintains the two power connectors connected would require physical tampering to over ride, making it evident to the owner of the system that a requestor has attempted to bypass the system.

Among the items deemed novel and non-obvious herein are:

1. A device connected with a piece of electronic equipment for purposes of controlling access to, and/or monitoring the use of, a piece of electronic equipment. The device uses one of the following means: (a) an access controller for powered equipment; (b) a non-invasive or having the need to alternator/modify the equipment that it is being connected to; (c) user specific limitations so that access can be controlled from anywhere. For this device, use is not just for restricting access. It can also be used to monitor log in usage for either safety or production purposes.
2. A non-destructive method of attaching such a device wherein the node connects inline with a piece of equipment. The controller has the receiving end of a power connector that allows equipment to plug into it and the plugs are held together with an apparatus that securely encases and affixes both cord ends together. That apparatus is kept in place via a lock that gets installed by a system administrator.
3. The node for this device uses a method of input for uniquely identifying the individual who has requested access to a particular piece of equipment. Such identification may not be limited to identifying just one individual; it could be used to identify a given product through its production. The node could use a method of uniquely identifying an individual and/or production. That method may include, but not be limited to, one or more of the following options: RFID, PIN, biometrics, phone (NFC), magnetic, heart rate, facial imaging, bar code.
4. A controller for this invention may work by interrupting the power being sent to the equipment. One method of interruption occurs by ways of an electronic switch that can be in the form of a relay, transistor or other similarly functioning switch. Additional power controls can be added for allowing multiple devices to be initiated or engaged at the same time.
5. As part of the power control concept, the node of this invention will have a method of collecting and monitoring power consumption at any given time.
6. Communication with the hub for data should be included. Once data is read by this device, it may be transmitted via a wireless or wired connection to a central location where the data is stored and compared for access.

There have been shown and described preferred embodiments of power control devices and methods for their use. It is apparent to those skilled in the art, however, that many changes, variations, modifications, and other uses and applications for the apparatus, its components, and methods for its use are possible, and also such changes, variations, modifications, and other uses and applications which do not depart from the spirit and scope of the invention are deemed to be covered by the invention, which is limited only by the claims which follow.

What is claimed is:

1. A method for controlling power flow to an electrical device comprising:
   (i) providing a power control system that includes:
      a first contact for electrical communication with a first plug to a current source;
      a second contact for electrical communication with a second plug to the electrical device;
      a switch in communication with the first contact and the second contact, the switch movable between an on-condition, where electric current flows through the switch, and an off-condition, where electrical current does not flow through the switch;
      a moveable member, moveable between a first position and a second position, said movable member including:
         (a) a first portion for causing the switch to move between the on-condition, when the movable member is in the first position, and the off-condition, when the moveable member is in the second position; and
         (b) an electronic card reader which takes an individual operator card when properly positioned on said reader to open the switch for a preset amount of time from the off-condition to the on-condition, said reader being in contact with a database for determining whether a holder of that operator card is authorized to have the switch opened from the off-condition to the on-condition; and a lockable housing for encasing the first plug and the second plug;
   (ii) inserting the power control system between the first plug to the current source and the second plug to the electrical device;
   (iii) locking an enclosure about the first plug and the second plug; and
   (iv) activating the reader to receive individual operator cards and verifying a numerical or biometric identifier from each card before determining whether the switch can be moved from the off-condition to the on-condition.

2. The method of claim 1 wherein the reader further records and keeps track of every operator card that has attempted to access and run the electrical device.

3. The method of claim 1 wherein the reader keeps track of when and for how long every operator card has run the electrical device.

4. The method of claim 1 wherein the reader includes a visual indicator that the operator card is authorized to run the electrically powered device to which it is connected.

5. The method of claim 1 wherein the reader includes an audio indicator that the operator card is authorized to run the electrically powered device to which it is connected.

6. The method of claim 1 wherein the numerical or biometric identifier is selected from the group consisting of: an RFID signal, a phone (NFC) signal, a PIN identifier, a magnetic strip and a bar code.

7. The method of claim 1 wherein the numerical or biometric identifier is selected from the group consisting of: a fingerprint, a heart rate, an eye pattern, a vein pattern in an operator's hand and facial imaging.

8. The method of claim 1, which further includes an interrupter for moving the switch from the on-condition to the off-condition before an amount of authorized use is about to be exceeded.

9. The method of claim 1 wherein the database is external of the reader.

10. The method of claim 1 wherein the switch is electronic.

* * * * *